(12) United States Patent
Hwu et al.

(10) Patent No.: US 8,248,701 B1
(45) Date of Patent: Aug. 21, 2012

(54) OPTICAL LENS ASSEMBLY HAVING FLUORESCENT LAYER

(75) Inventors: Jon-Fwu Hwu, Hsinchu (TW); Yung-Fu Wu, Hsinchu (TW); Kui-Chiang Liu, Hsinchu (TW)

(73) Assignee: Gem Weltronics TWN Corporation, Hsinchu County (TW)

( * ) Notice: Subject to any disclaimer, the term of this patent is extended or adjusted under 35 U.S.C. 154(b) by 2 days.

(21) Appl. No.: 13/034,708

(22) Filed: Feb. 25, 2011

(51) Int. Cl.
*G02B 27/10* (2006.01)
(52) U.S. Cl. .................................................... 359/618
(58) Field of Classification Search ................. 359/819; 313/501, 483
See application file for complete search history.

(56) References Cited

U.S. PATENT DOCUMENTS

| | | | | |
|---|---|---|---|---|
| 4,989,967 | A * | 2/1991 | Matsuda | 351/165 |
| 5,808,817 | A * | 9/1998 | Miyamoto et al. | 359/819 |
| 2010/0061097 | A1 * | 3/2010 | Krogman | 362/249.03 |
| 2011/0204746 | A1 * | 8/2011 | Kume | 310/306 |

* cited by examiner

*Primary Examiner* — James Jones
(74) *Attorney, Agent, or Firm* — Lin & Associates IP, Inc.

(57) ABSTRACT

An optical lens assembly having a fluorescent layer is disclosed, which includes a partition frame with a partition ring protruding inwardly from an inner wall surface of the partition frame, two optical lenses, and a fluorescent layer, wherein a slot space is defined by the two optical lenses and the partition ring of the partition frame, and the fluorescent layer is accommodated within the slot space. The top optical lens can be a flat slab lens, or a convex lens. When the optical lens assembly having a fluorescent layer is used in the optical device, the moisture can be prevented from entering the fluorescent layer, and thus the optical performance of the fluorescent layer can be maintained over a long period.

9 Claims, 10 Drawing Sheets

OPTICAL LENS ASSEMBLY HAVING FLUORESCENT LAYER

BACKGROUND OF THE INVENTION

1. Field of the Invention

The present invention relates to an optical lens assembly, and especially to an optical lens assembly having a fluorescent layer for preventing the moisture from entering the fluorescent layer formed therein, and thereby the optical performance of the fluorescent layer can be maintained over a long period, and thus the optical lens assembly of the present invention can be applied to the array-type LED packaging.

2. The Prior Arts

An LED is a semiconductor light source, which operates based on the recombination of carriers (electrons and holes) in a semiconductor. When an electron carrier in the conduction band combines with a hole in the valence band, it loses energy equal to the bandgap in the form of an emitted photon; i.e., light. The LEDs have the advantages of compact size, fast start-up time, and high efficiency so that they can be applied to various applications especially in the field of solid-state lighting.

Referring to FIG. 1, which is a cross-sectional view showing a conventional LED package structure, which includes a substrate 10a, a package module 12a, a lead frame 14a, and an encapsulation layer 16a. The substrate 10a is installed at the bottom of the package structure. The package module 12a is served to integrate the substrate 10a and the lead frame 14a. The LED chips 18a are arranged on the substrate 10a in an array form, and the substrate 10a is made of a metal material. The LED chips 18a are electrically connected to the lead frame 14a. The encapsulation layer 16a is tightly connected to the package module 12a. An insulating protective layer 20a is formed on the LED chips 18a for covering the LED chips 18a. Then, a fluorescent layer 22a is formed on the insulating protective layer 20a.

However, one disadvantage of the prior art is that the fluorescent layer formed above the LED chips is directly in contact with moisture in the air. It is known that a fluorescent material can absorb moisture from the air, and would result in the deterioration in light emission properties, and the level of white light would gradually decay. Moreover, the fluorescent layer can directly absorb heat generated by light irradiation. In general, the heat resistant temperature and thermal stability of a fluorescent layer are relatively low, and thereby once heat generated by light irradiation is conducted to the fluorescent layer, the fluorescent material would deteriorate over time, and consequently the illumination efficiency is decreased and the chromaticity is altered.

Moreover, if a fluorescent material is formed on an LED chip by filling or coating method, an extra amount of the fluorescent material has to be provided for ensuring that the fluorescent material will be substantially uniform on the LED chip, which will increase the manufacturing cost. Furthermore, if the fluorescent layer has flaws, the LED chip can not be reused. Conventionally, various optical tests can only be carried out after the formation of the fluorescent layer. Therefore, there is a need to provide an LED package structure which can be optically tested in advance, has relatively low manufacturing cost, and has excellent optical mixing and heat dissipation properties.

SUMMARY OF THE INVENTION

A primary objective of the present invention is to provide an optical lens assembly having a fluorescent layer. The fluorescent layer in the optical lens assembly was sealed under a vacuum, and thereby when the optical lens assembly of the present invention is used in the optical device, the moisture is prevented from entering the fluorescent layer, and thereby the optical performance of the fluorescent layer can be maintained over a long period.

Another objective of the present invention is to provide an optical lens assembly having a fluorescent layer. The structure of the optical lens assembly having a fluorescent layer is simple, and the optical lens assembly of the present invention can be prefabricated before it is applied to the array-type LED packaging, and thereby the packaging efficiency is increased.

To achieve the foregoing objectives, the present invention provides an optical lens assembly having a fluorescent layer, which comprises: a partition frame having a partition ring which protrudes inwardly from an inner wall surface of the partition frame, wherein an L-shaped structure is defined by a top surface of the partition ring and the inner wall surface of the partition frame, and a reverse L-shaped structure is defined by a bottom surface of the partition ring and the inner wall surface of the partition frame; two optical lenses comprising a top optical lens and a bottom optical lens, wherein the top optical lens and the bottom optical lens are respectively disposed on the top surface and the bottom surface of the partition ring, and wherein a slot space is defined by the top optical lens, the bottom optical lens, and the partition ring of the partition frame; and a fluorescent layer accommodated within the slot space.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
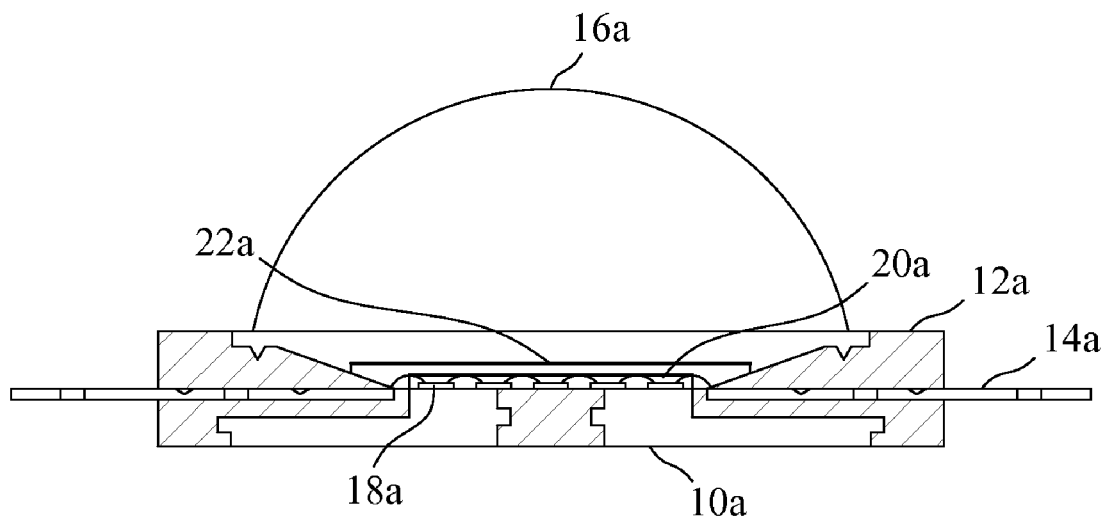
FIG. 1 is a cross sectional view showing a conventional LED package structure.
Figure 2:
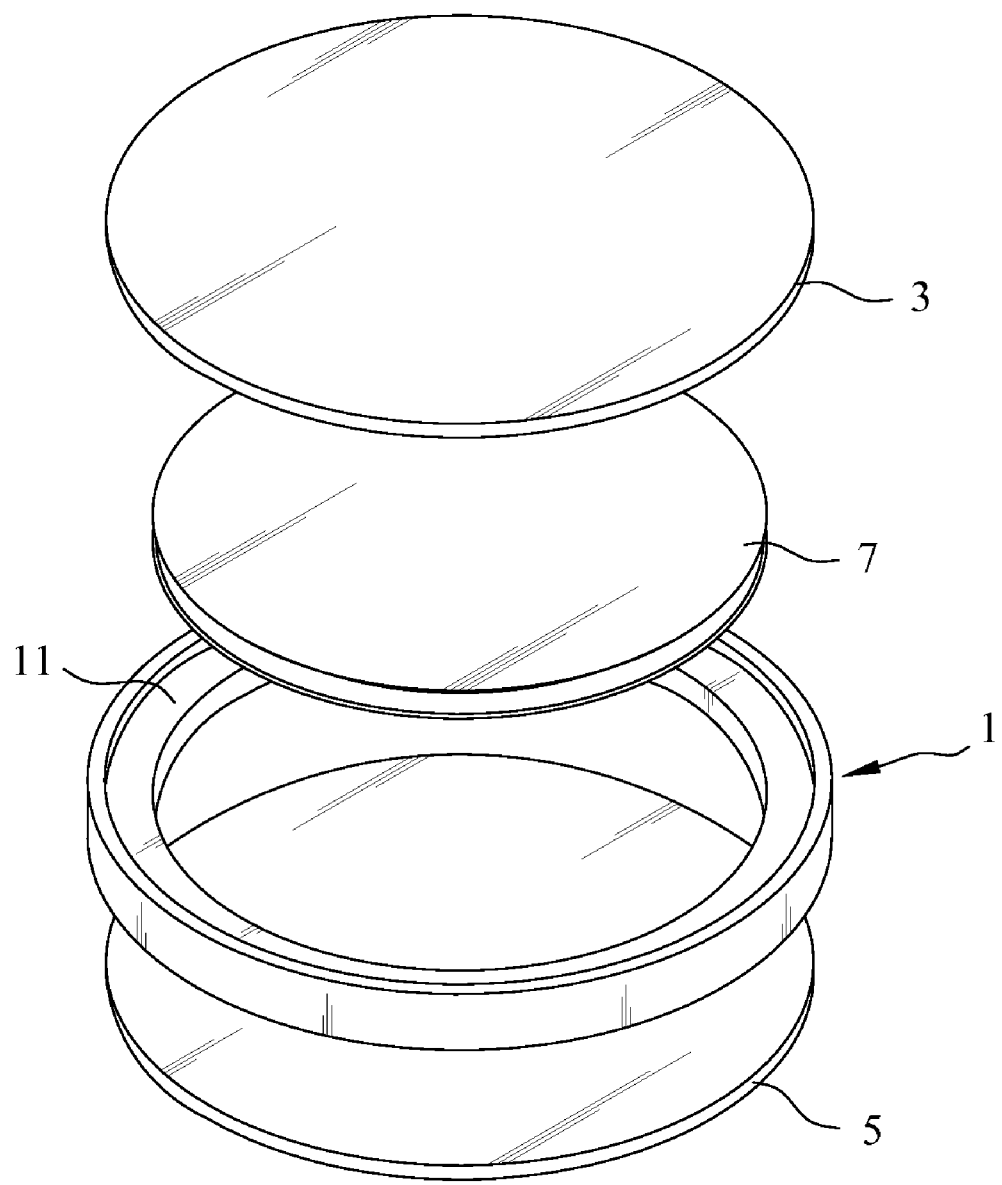
FIG. 2 is an exploded view showing the optical lens assembly having a fluorescent layer according to the present invention.
Figure 3:
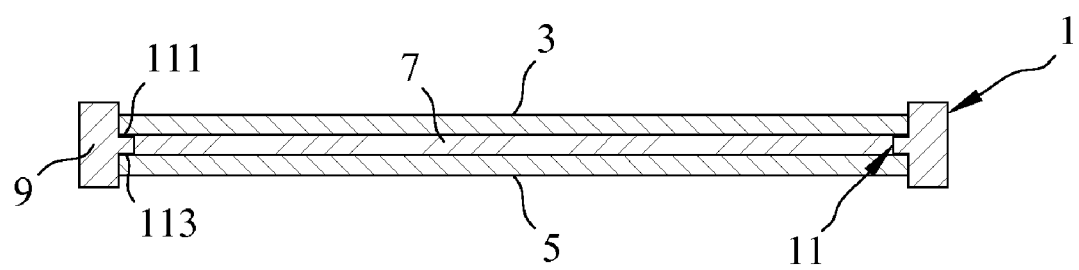
FIG. 3 is a cross sectional view showing the optical lens assembly having a fluorescent layer according to the present invention.

FIG. 2 is an exploded view showing the optical lens assembly having a fluorescent layer according to the present invention. FIG. 3 is a cross sectional view showing the optical lens assembly having a fluorescent layer according to the present invention. The optical lens assembly having a fluorescent layer according to the present invention comprises a partition frame 1 with a partition ring 11 protruding inwardly from an inner wall surface of the partition frame, two optical lenses 3 and 5, and a fluorescent layer 7. As shown in FIGS. 2 and 3, a partition frame 1 is provided, and a partition ring 11 protrudes inwardly from the inner wall surface of the partition frame 1. The partition ring 11 protruding inwardly from the inner wall surface of the partition frame 1 has a top surface 111 and a bottom surface 113. An L-shaped structure is defined by the top surface 111 of the partition ring 11 and the inner wall surface (which is above the partition ring 11) of the partition frame 1. A reverse L-shaped structure is defined by the bottom surface 113 of the partition ring 11 and the inner wall surface (which is below the partition ring 11) of the partition frame 1. The shape of the partition frame 1 includes round, elliptical, rectangular, and polygonal shapes.

The material of the partition frame 1 comprises at least one of glass, aluminum, bronze, ceramic and an alloy composed of at least one of aluminum and bronze, or comprises at least one of liquid crystal polymer (LCP), polyphthalamide (PPA), and all high temperature resistant materials. The shape of the partition ring 11 includes round, elliptical, rectangular, and polygonal shapes. The partition ring 11 of the partition frame 1 is made of UV-curable adhesive, silicone, epoxy resin, or polyimide.

Figure 4:
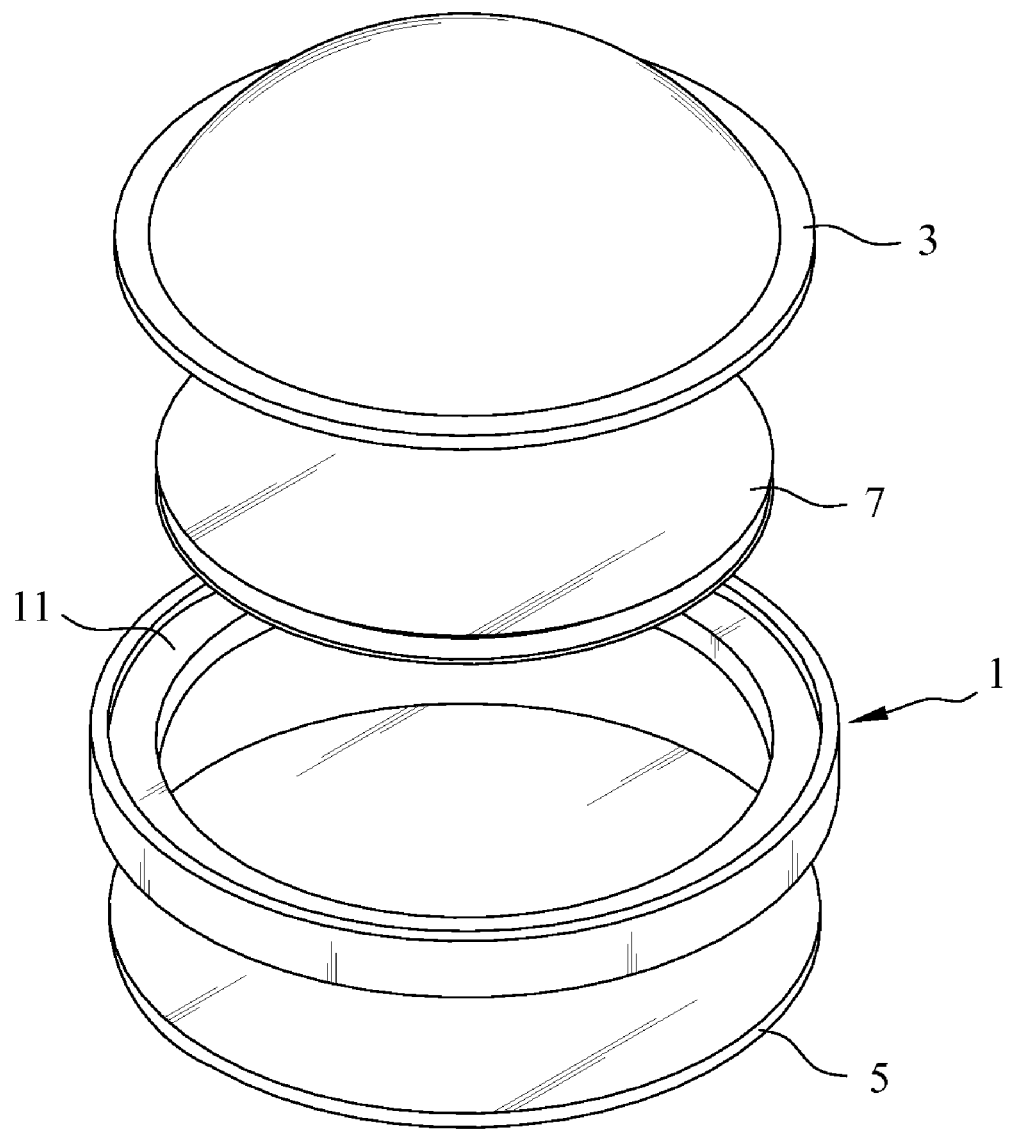
FIG. 4 is a schematic view showing a top optical lens according to one embodiment of the present invention.

Two optical lenses include a top optical lens 3 and a bottom optical lens 5. The top optical lens 3 and the bottom optical lens 5 are respectively installed on the top surface 111 and the bottom surface 113 of the partition ring 11. A slot space is defined by the top optical lens 3, the bottom optical lens 5 and the partition ring 11 of the partition frame 1. The fluorescent layer 7 can be accommodated in the slot space by the dispensing method. The top optical lens 3 or the bottom optical lens 5 can be a flat slab lens, and the top optical lens 3 can also be a convex lens as shown in FIG. 4.

Figure 5:
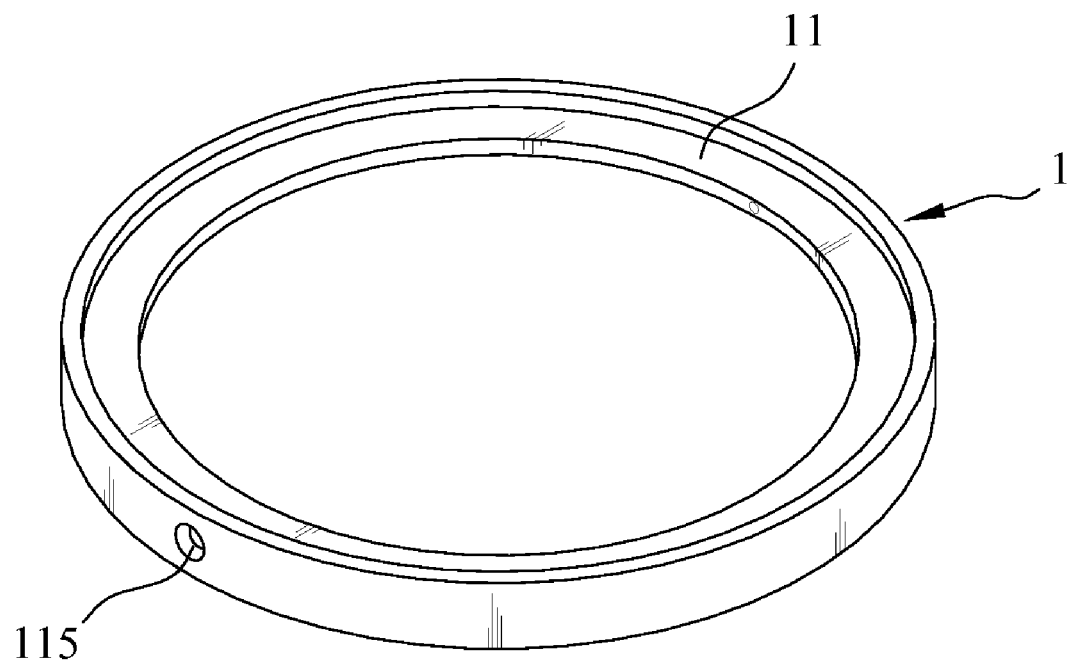
FIG. 5 is a schematic view showing a partition frame according to the first embodiment of the present invention.
Figure 5A:
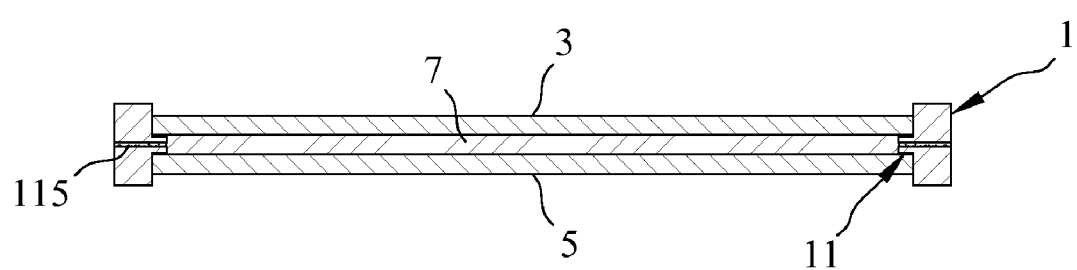
FIG. 5a is a schematic view showing the partition frame of FIG. 5 assembled with the fluorescent layer, the top optical lens, and the bottom optical lens.

FIG. 5 is a schematic view showing the partition frame according to the first embodiment of the present invention. FIG. 5a is a schematic view showing the partition frame of FIG. 5 assembled with the fluorescent layer 7, the top optical lens 3, and the bottom optical lens 5. At least two slots 115 can be located diametrically opposite to each other in the partition frame 1. The at least two slots 115 are formed through the partition ring 11 to communicate the interior and exterior of the partition frame 1, and the fluorescent material can be filled in the slot space through one of the at least two slots 115 so as to form a fluorescent layer 7 in the slot space.

A filling material is used to seal the at least two slots, 115 (not shown), and the filling material includes a nail member, and an adhesive. The adhesive includes at least one of UV-curable adhesive, silicone, epoxy resin and polyimide, and the material of the nail member includes at least one of plastic and metal. The slot space is evacuated through the at least two slots 115, and then a fluorescent material is filled in the slot space so as to form a fluorescent layer 7.

Figure 6:
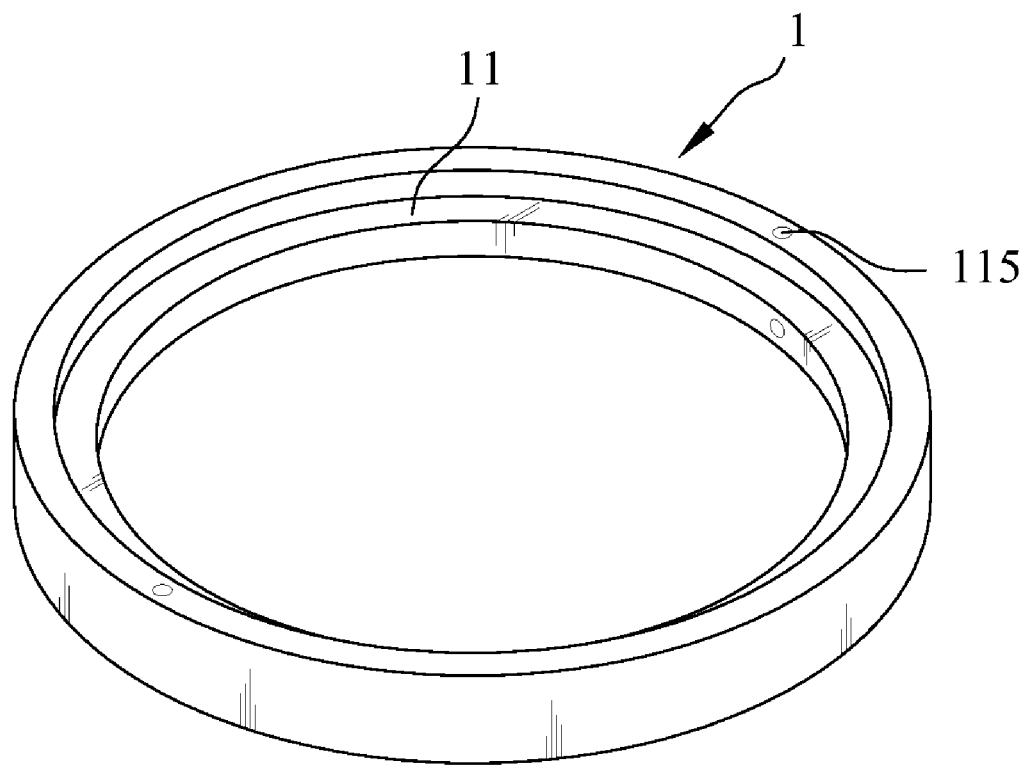
FIG. 6 is a schematic view showing the partition frame according to the second embodiment of the present invention.
Figure 6A:
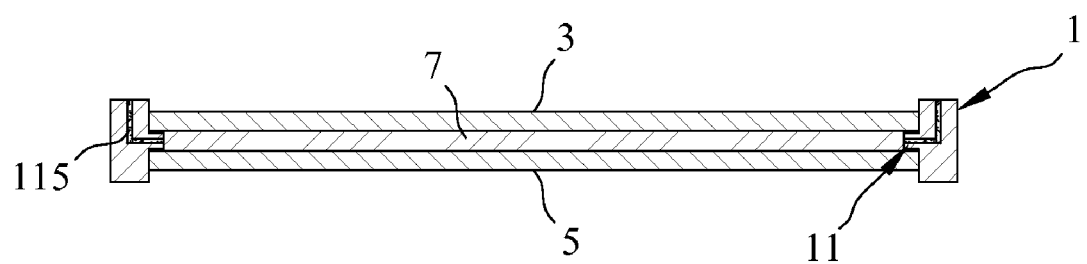
FIG. 6a is a schematic view showing the partition frame of FIG. 6 assembled with the fluorescent layer, the top optical lens, and the bottom optical lens.

Referring to FIG. 6, which is a schematic view showing the partition frame according to the second embodiment of the present invention. FIG. 6a is a schematic view showing the partition frame of FIG. 6 assembled with the fluorescent layer 7, the top optical lens 3, and the bottom optical lens 5. The two slots 115 are formed on the surfaces of the L-shaped structure or the reverse L-shaped structure, and one opening end of each of two slots 115 is arranged on the inner surface of the partition ring 11, and the other opening end of each of the two slots is arranged on the top or bottom surface of the partition frame 1. The adhesive 8 is used to seal the at least two slots 115. The adhesive 8 includes at least one of UV-curable adhesive, silicone, epoxy resin, and polyimide. The slot space is evacuated through the at least two slots 115, and then a fluorescent material is filled in the slot space so as to form a fluorescent layer.

Figure 7:
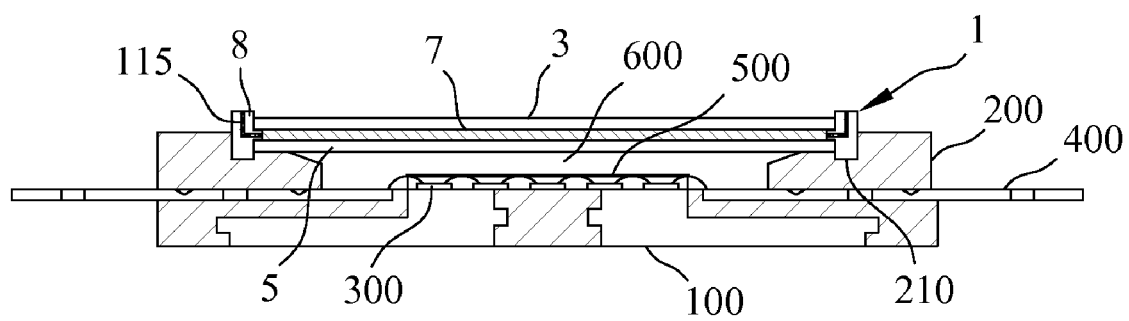
FIG. 7 is a schematic view showing an optical lens assembly having a fluorescent layer applied to an array-type LED according to one embodiment of the present invention.
Figure 8:
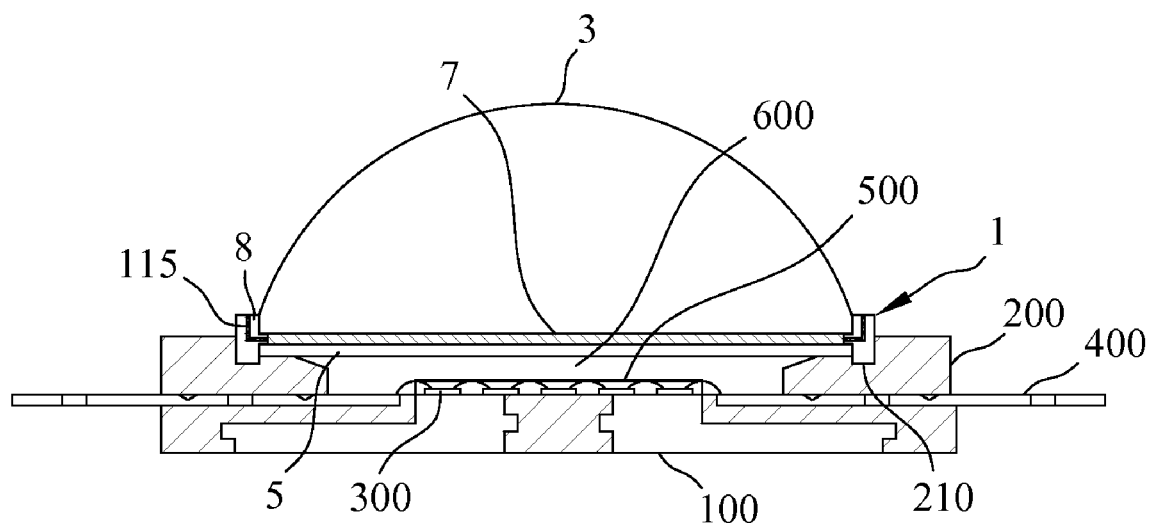
FIG. 8 is a schematic view showing an optical lens assembly having a fluorescent layer applied to an array-type LED according to another embodiment of the present invention.

Referring to FIG. 7, which is a schematic view showing an array-type LED according to one embodiment of the present invention. Referring to FIG. 8, which is a schematic view showing an array-type LED according to another embodiment of the present invention. An array-type LED includes a substrate 100 and a package body 200. The substrate 100 is disposed at the bottom of the array-type LED and is installed with a plurality of LED light-emitting elements 300. The LED light-emitting elements 300 are arranged on the substrate 100 in an array form. The LED light-emitting elements 300 are electrically connected to two lead frames 400 installed in the package body 200 by wire bonding. A chip protective layer 500 and a silicone layer 600 are sequentially formed on top of the light emitting units 300. A frame fastening slot 210 is installed in the partition frame 1 corresponding to the assembling position for a package body 200 on the partition frame 1 so that the package module 200 can be assembled with the partition frame 1. Therefore, the partition frame assembly of the present invention can be assembled with various LED package bodies. The top optical lens 3 can be a convex lens as shown in FIG. 8.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical lens assembly having a fluorescent layer, comprising:
   a partition frame having a partition ring, the partition ring protruding inwardly from an inner wall surface of the partition frame, an L-shaped structure being defined by a top surface of the partition ring and the inner wall surface of the partition frame, a reverse L-shaped structure being defined by a bottom surface of the partition ring and the inner wall surface of the partition frame;
   two optical lenses comprising a top optical lens and a bottom optical lens, the top optical lens and the bottom optical lens being respectively disposed on the top surface and the bottom surface of the partition ring, wherein a slot space is defined by the top optical lens, the bottom optical lens, and the partition ring of the partition frame; and
   a fluorescent layer accommodated within the slot space;
   wherein the partition frame further has at least two slots formed through the partition ring, filled and sealed with a filling material.

2. The optical lens assembly according to claim 1, wherein the partition frame and the partition ring are integrally formed.

3. The optical lens assembly according to claim 1, wherein a material of the partition frame includes at least one of glass, aluminum, bronze, ceramic and an alloy composed of at least one of aluminum and bronze.

4. The optical lens assembly according to claim 1, wherein a material of the partition frame includes at least one of liquid crystal polymer (LCP) and polyphthalamide (PPA).

5. The optical lens assembly according to claim 1, wherein a material of the partition ring includes at least one of UV-curable adhesive, silicone, epoxy resin, or polyimide.

6. The optical lens assembly according to claim 1, wherein the partition frame has round, elliptical, rectangular, or polygonal shape.

7. The optical lens assembly according to claim 1, wherein the filling material includes a nail member and an adhesive, and wherein a material of the nail member includes at least one of plastic and metal, and a material of the adhesive includes at least one of UV-curable adhesive, silicone, epoxy resin and polyimide.

8. The optical lens assembly according to claim 1, wherein the at least two slots are located diametrically opposite to each other, and each of the at least two slots has one opening end arranged on an inner wall surface of the partition ring and the other opening end arranged on an outer wall surface of the partition frame.

9. The optical lens assembly according to claim 1, wherein the at least two slots are located diametrically opposite to each other, and each of the at least two slots is an L-shaped slot with one opening end arranged on an inner wall surface of the partition ring and the other opening end arranged on a top or bottom surface of the partition frame.

* * * * *